(12) United States Patent
Youcef-Toumi et al.

(10) Patent No.: US 10,078,031 B2
(45) Date of Patent: Sep. 18, 2018

(54) COMPLIANT LEAK DETECTION SYSTEM

(71) Applicants: Massachusetts Institute of Technology, Cambridge, MA (US); King Fahd University of Petroleum and Minerals, Dhahran (SA)

(72) Inventors: Kamal Youcef-Toumi, Cambridge, MA (US); Dimitrios Chatzigeorgiou, Somerville, MA (US); Rached Ben-Mansour, Dhahran (SA)

(73) Assignees: Massachusetts Institute of Technology, Cambridge, MA (US); King Fahd University of Petroleum and Minerals, Dhahran (SA)

( * ) Notice: Subject to any disclaimer, the term of this patent is extended or adjusted under 35 U.S.C. 154(b) by 182 days.

(21) Appl. No.: 15/044,176

(22) Filed: Feb. 16, 2016

(65) Prior Publication Data
US 2017/0234759 A1     Aug. 17, 2017

(51) Int. Cl.
    *G01M 3/28* (2006.01)
(52) U.S. Cl.
    CPC .................. *G01M 3/2807* (2013.01)
(58) Field of Classification Search
    CPC ............ G01M 3/00; G01M 3/26; G01M 3/28; G01M 3/2807
    See application file for complete search history.

(56) References Cited

U.S. PATENT DOCUMENTS

| | | | |
|---|---|---|---|
| 3,691,819 A | 9/1972 | Guest | |
| 3,967,194 A | 6/1976 | Beaver et al. | |
| 4,770,105 A | 9/1988 | Takagi et al. | |
| 4,996,879 A | 3/1991 | Kruka et al. | |
| 5,675,506 A | 10/1997 | Savic | |
| 5,974,862 A | 11/1999 | Lander et al. | |
| 6,102,611 A | 8/2000 | Hampton | |
| 6,530,263 B1 | 3/2003 | Chana | |
| 6,826,948 B1 | 12/2004 | Bhatti et al. | |
| 8,869,599 B2 | 10/2014 | Ben-Mansour | |

(Continued)

FOREIGN PATENT DOCUMENTS

| | | |
|---|---|---|
| CA | 2621035 A1 | 4/2007 |
| GB | 2364126 A | 1/2002 |
| WO | 2004/031719 A1 | 4/2004 |

OTHER PUBLICATIONS

Hunaidi et al., Acoustical Characteristics of Leak Signals in Plastic Disribution Pipes, Applied Acoustics, 1999, pp. 235-254, vol. 58(3), Elsevier B.V., Netherlands.

(Continued)

*Primary Examiner* — Nguyen Ha
(74) *Attorney, Agent, or Firm* — Nuttler McClemmen & Fish LLP

(57) ABSTRACT

Compliant leak detection system. The system includes structure adapted to support at least two rows of leak detection leaves, each leak detection leaf supported by an arm pivotally attached to the structure and urged outwardly by a torsion spring into contact with a pipe wall so as to adjust for changes in pipe diameter. The leak detection leaf includes a rigid support and a flexible member such that suction from a leak will cause the flexible member to contact the pipe wall and put a drag force on the structure. An axial force transmitting drum measures the drag force to indicate presence of a leak.

7 Claims, 6 Drawing Sheets

(56) References Cited

U.S. PATENT DOCUMENTS

| | | | |
|---|---|---|---|
| 9,366,596 B2* | 6/2016 | Mekid | G01M 3/005 |
| 2002/0124633 A1 | 9/2002 | Yang et al. | |
| 2002/0134140 A1 | 9/2002 | Baumoel | |
| 2003/0167847 A1 | 9/2003 | Brown et al. | |
| 2004/0128034 A1 | 7/2004 | Lenker et al. | |
| 2005/0126316 A1 | 6/2005 | Richter et al. | |
| 2005/0246112 A1 | 11/2005 | Abhulimen et al. | |
| 2006/0137090 A1 | 6/2006 | Jeffries et al. | |
| 2006/0174707 A1 | 8/2006 | Zhang | |
| 2006/0248966 A1 | 11/2006 | Houldey et al. | |
| 2007/0051165 A1 | 3/2007 | Maresca et al. | |
| 2008/0066812 A1 | 3/2008 | Tornay | |
| 2008/0133063 A1 | 6/2008 | Bisson et al. | |
| 2008/0307877 A1 | 12/2008 | Cook et al. | |
| 2012/0255343 A1* | 10/2012 | Sarma | G01M 3/2807 |
| | | | 73/40.5 R |
| 2013/0133429 A1 | 5/2013 | Palma et al. | |
| 2013/0186181 A1 | 7/2013 | Ben-Mansour et al. | |
| 2013/0199272 A1 | 8/2013 | Khalifa et al. | |
| 2014/0020450 A1* | 1/2014 | Hawwa | G01M 3/2823 |
| | | | 73/40.5 R |
| 2014/0130577 A1 | 5/2014 | Chatzigeorgiou et al. | |

OTHER PUBLICATIONS

Yang et al., Leak location using blind system identification in water distribution pipelines, Journal of sound and vibration, 2008, pp. 134-148, vol. 310(1-2), Elsevier B.V., Netherlands.

Ben-Mansour et al., Computational Fluid Dynamic Simulation of Small Leaks in Water Pipelines for Direct Leak Pressure Transduction. Computer and Fluids, 2012, pp. 110-123, vol. 57. Elsevier B.V., Netherlands.

Darby et al., Providing reliable supply of safe drinking water poses challenges, California Agriculture, 2000, pp. 69-77, vol. 54(5), California.

Notification of transmittal of the internationl search report dated Apr. 13, 2017 for PCT/US2017/017902.

[No Author Listed] "Plugging the Gap," (ArabianBusiness.com staff writer) OSI Soft website article, <http://www.osisoft.com:80/Resources/Articles/Plugging+the+gap.htm>, Oct. 2, 2007.

Kurtz, D.W., "Developments in Free-Swimming Acoustic Leak Detection Systems for Water Transmission Pipelines," ASCE Library, American Society of Civil Engineers Pipeline Division Specialty Conference 2006 (7 pages).

* cited by examiner

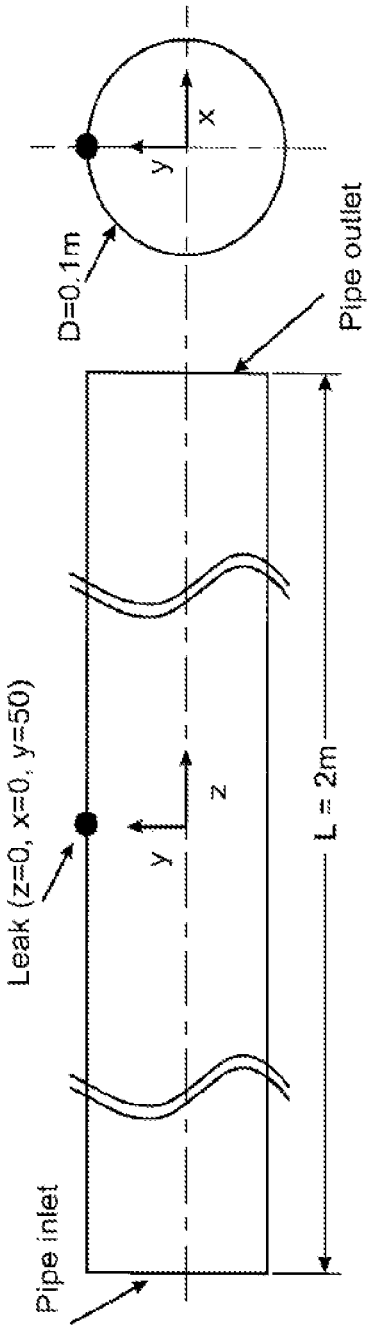
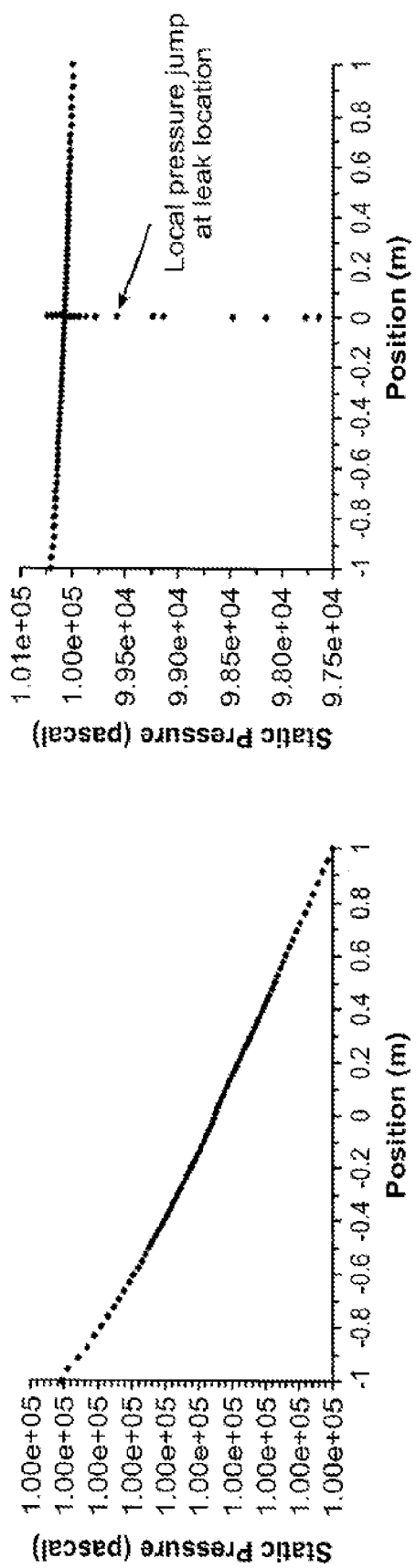
FIG. 1 (a)
FIG. 1 (b)
FIG. 1 (c)

Multilayer scaling vs clean pipe

COMPLIANT LEAK DETECTION SYSTEM

BACKGROUND OF THE INVENTION

This invention relates to a compliant leak detection system.

Considerable research and development (R&D) efforts have been exerted around the world to develop technologies to detect water leaks in water distribution networks. Water leakage can reach 30% on average of the water transported across water distribution networks [1, 2]. Current leak detection methods [3] include leak noise correlators, surface listening devices, ground penetrating radars, infrared thermography, and chemical tracing. These methods have many limitations when applied to actual water distribution networks. They can be expensive or time consuming, inaccurate, have noise interference problems, and sometimes depend on pipe material.

Acoustic and noise correlators [4, 5] are the widely used methods for leak detection at the present time by water municipalities worldwide. These methods work well in metal pipes; however, the effectiveness of the methods is doubtful with plastic pipes due to high signal attenuation, low frequency content, and the pronounced effect of fittings on the wave propagation. Recently, leak detection using in-pipe moving sensors, like Sahara and Smartball systems, is considered to overcome many shortcomings of the conventional acoustic leak detection devices. The motivation for venturing into this technique stems from the ability to survey a long distance pipeline in a network and surveying portions of the network which may be logistically difficult to access by other techniques. The closeness of the sensor to the leak location may enable capturing clean signals so leak detection and localization becomes more independent of pipe material, pipe depth, soil type, background noise, and other environmental effects.

Based on detailed computer simulations and experimental validation, leaks can be detected by local pressure measurements. However, the pressure affected region is highly localized and this method requires a large number (more than 20 for a 2 mm leak size) of pressure transducers or equivalent sensors in order to detect a leak. This situation is mainly due to the fact that the pressure gradient caused by a leak is highly localized and its effect can only be sensed 1-2 leak diameters around the leak center. FIGS. 1a, 1b and 1c show a typical result where changes in the pressure distribution caused by leak are difficult to detect along the pipe centerline. Detection is only possible in the vicinity of the leak.

Ben-Mansour et al (U.S. Pat. No. 8,869,599 B2) invented a novel method that transforms the high-pressure gradient in the vicinity of the leak position into a force and consequently into a displacement that can be sensed by a small number of transducers (strain gages, load cells, piezo-electric transducers, etc.) which are optimally located. The transformation of the suction pressure (gradient) created by the leak into a force is accomplished by the use of a rigid body (a suction drum) which is suspended by force transducers connected on one end to the rigid body and Another end to a reference point (outer cage). The benefits of reducing the number of sensors are many and most of them are obvious. These include reduction of the product cost, reliability of the sensing system, reduction of the amount of data to be processed and hence the amount of power consumed as well as of the data processing requirements.

The system described above (U.S. Pat. No. 8,869,599 B2) works very well in clean and straight pipes. However water distribution pipes are far from clean once they are in use for more than one year. Because of solid particles dissolved in water, over time the pipes get scaled. The scale content depends on the solid particles carried by water. A clean and a scaled pipe are shown in FIG. 2. Under these condition the pipe has a variable diameter as the leak detector moves.

An object of the present invention is a compliant leak detection system that has the capability to change its outer size so as to bring a detecting structure such as a membrane close to a pipe (scaled or clean) wall at all times to detect a leak.

SUMMARY OF THE INVENTION

The compliant leak detection system of the invention includes structure adapted to support at least two rows of leak detection leaves, each leak detection leaf supported by an arm pivotally attached to the structure and urged outwardly by a torsion spring into contact with a pipe wall so as to adjust for changes in pipe diameter. A spherical bearing is placed at an end of each of the leak detection leaves for engaging an inner surface of the pipe wall. The leak detection leaf includes a rigid support and a flexible membrane, whereby suction from a leak will cause the flexible membrane to contact the pipe wall and put a drag force on the structure. An axial force transmitting drum is provided to measure the drag force to indicate a leak.

A preferred embodiment of the invention includes suction cups on the flexible membrane. The system may further include a gimbal mechanism to transmit axial forces to force transducers on the axial force transmitting drum. It is also preferred that the leak detection leaves cover an inner wall of the pipe for its entire circumference.

BRIEF DESCRIPTION OF THE DRAWING

FIG. 1a is a cross-sectional view of a pipe section including a leak.

FIG. 1b is a graph showing pressure variation along the pipe.

FIG. 1c is a graph of static pressure against position showing pressure variation along a line parallel to a center line at 1 mm from the pipe wall.

DESCRIPTION OF THE PREFERRED EMBODIMENT

The present invention discloses a compliant-drum leak detector system. This system has the capability to change its outer size so as to bring a detecting membrane close to a pipe wall at all times and to engage a scaled pipe interior while at the same time maintaining reliability of leak detection.

With reference now to FIGS. 3a, 3b, 3c and FIG. 4, a compliant leak detection device 10 includes structure 12 from which extend arms 14 that support leak detection leaves 16. The arms 14 are connected through a pivot joint to the structure 12. In this way, the leak detection leaves can maintain contact with a pipe wall having a varying diameter due to scaling.

Figure 2:
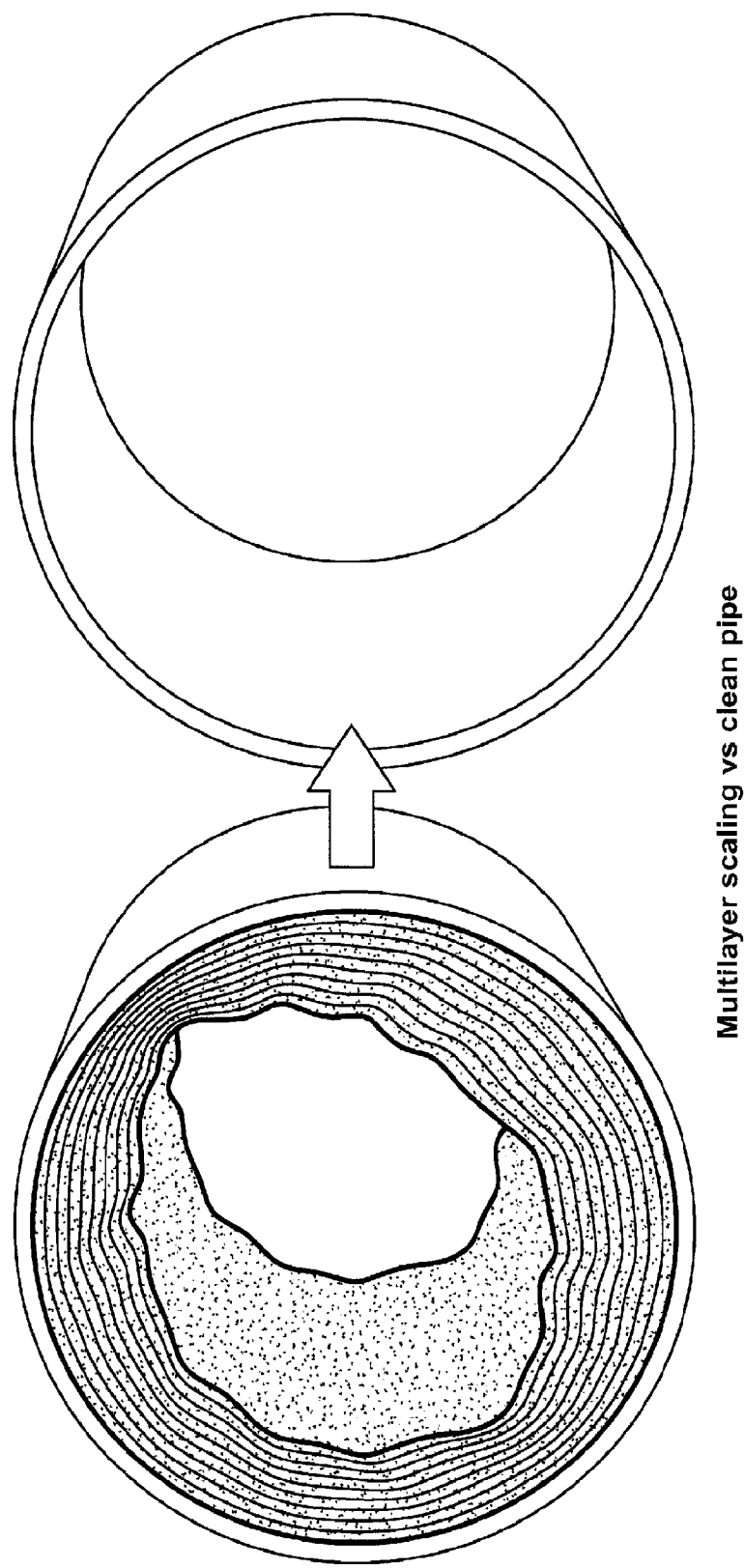
FIG. 2 illustrates scaled and clean pipe sections.
Figure 3:
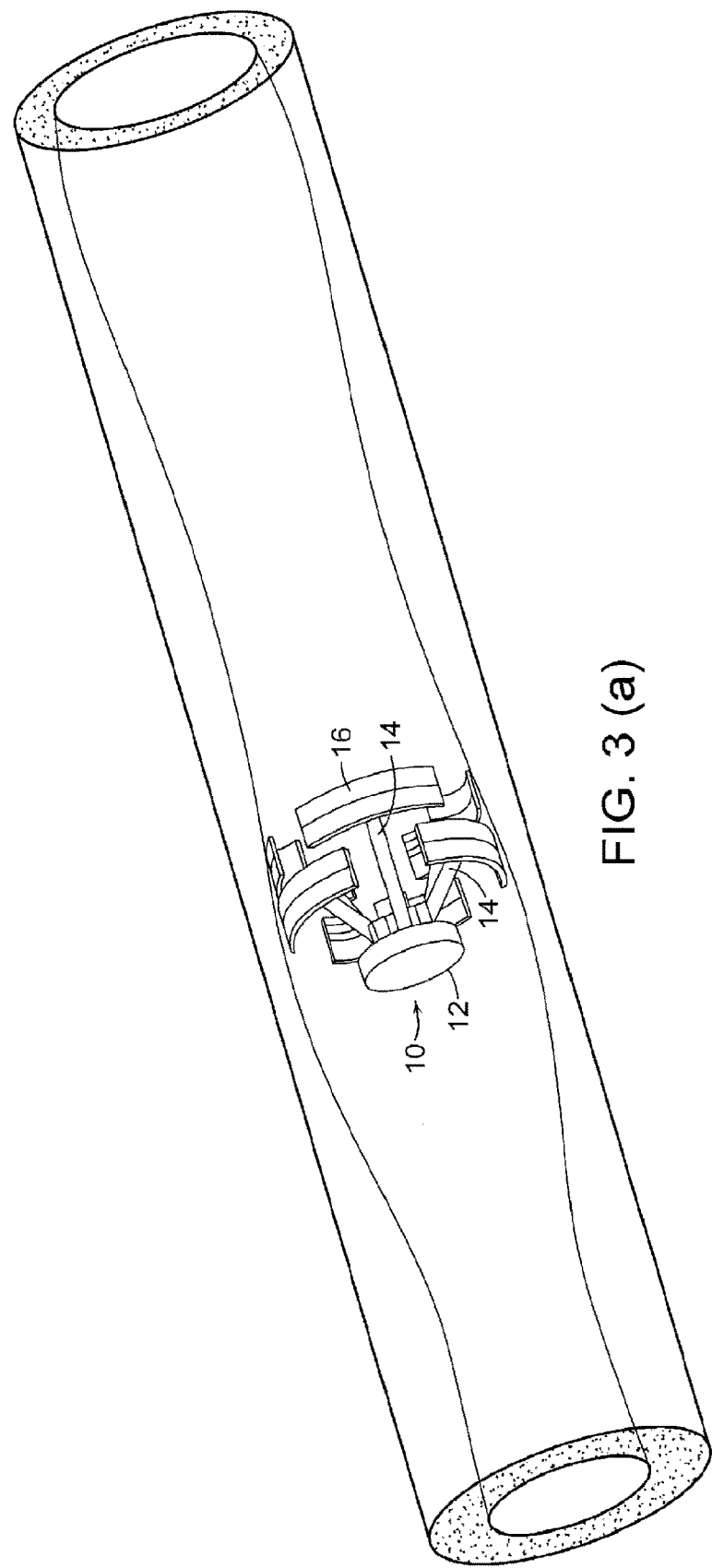
FIGS. 3a, 3b, and 3c are various views of an embodiment of the present invention.
Figure 3:
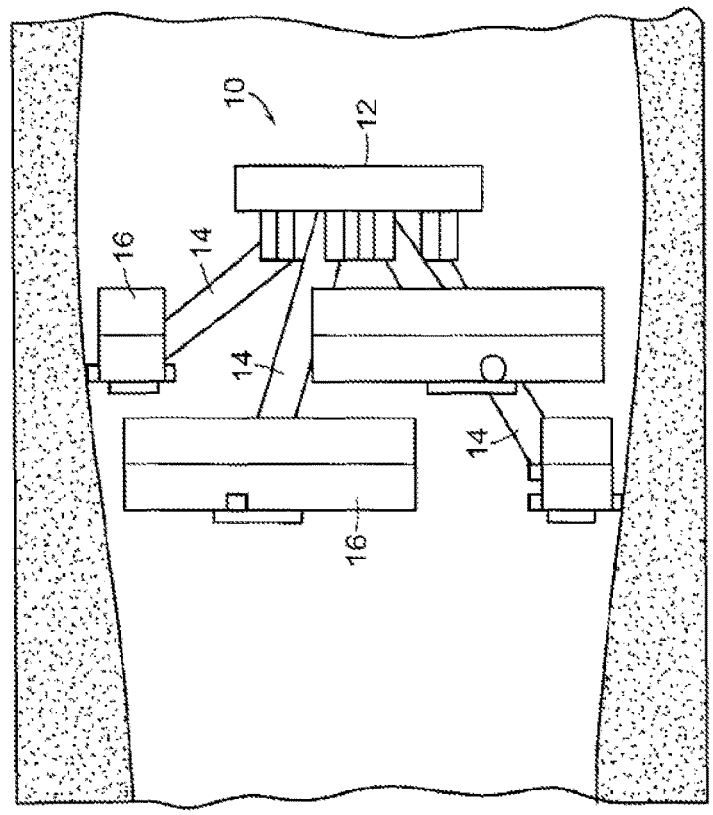
Figure 3:
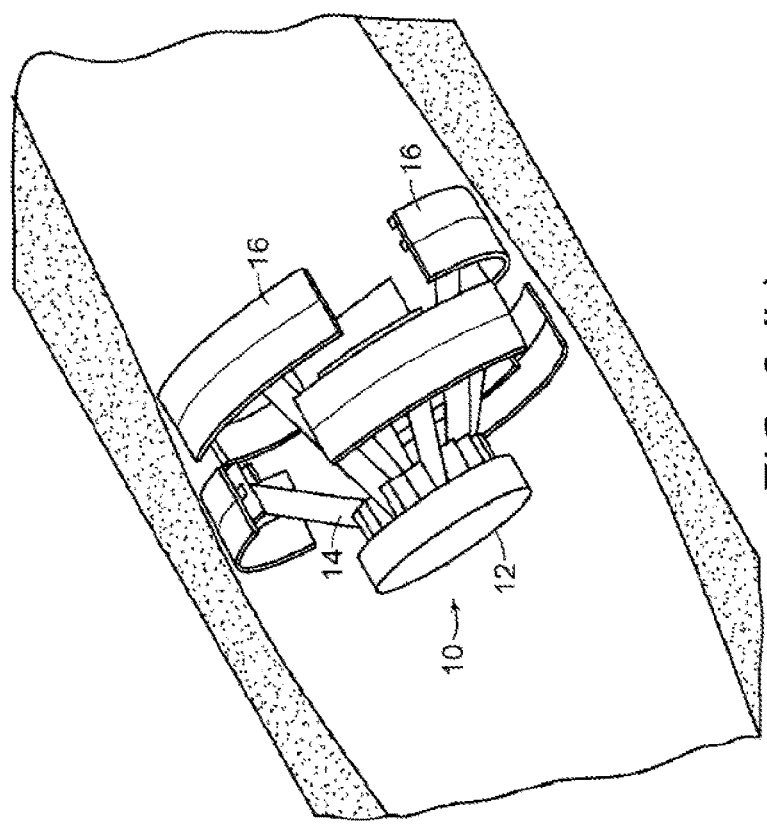
Figure 4:
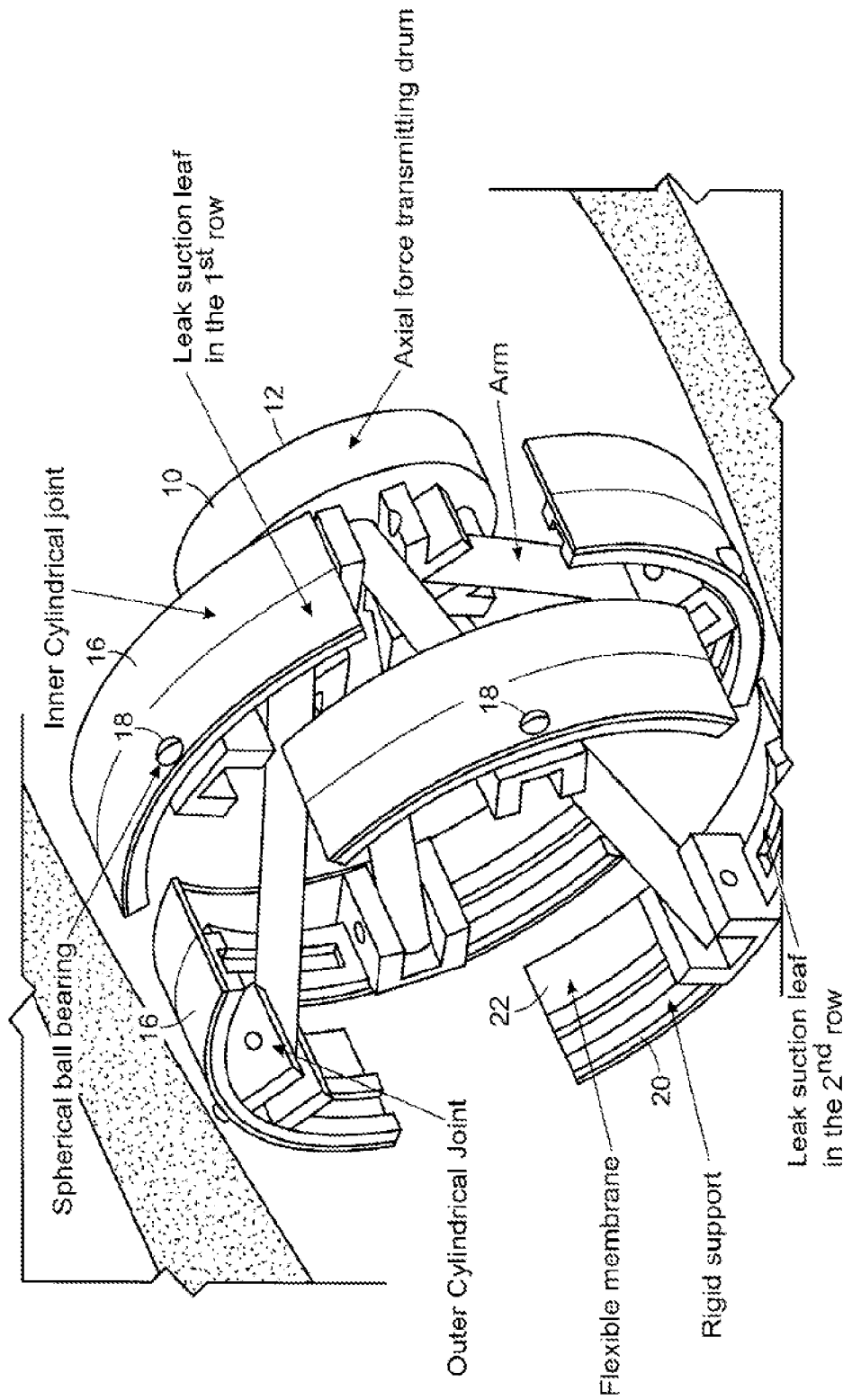
FIG. 4 is a perspective view of a preferred embodiment of the invention.

As can be seen best in FIG. 4, the end of each arm 14 includes a spherical bearing 18 that engages a pipe wall for smooth gliding along the wall. The leaf detecting structure 16 includes a rigid support 20 with a flexible membrane 22. It is noted that the arms 14 are urged outwardly by torsion springs (not shown) in the joint with respect to the structure 12.

As can be seen in FIG. 4, it is preferred that there be at least two rows of leak detection structures 16 to provide reliable leak detection at any circumferential location along a pipe wall.

Figure 5:
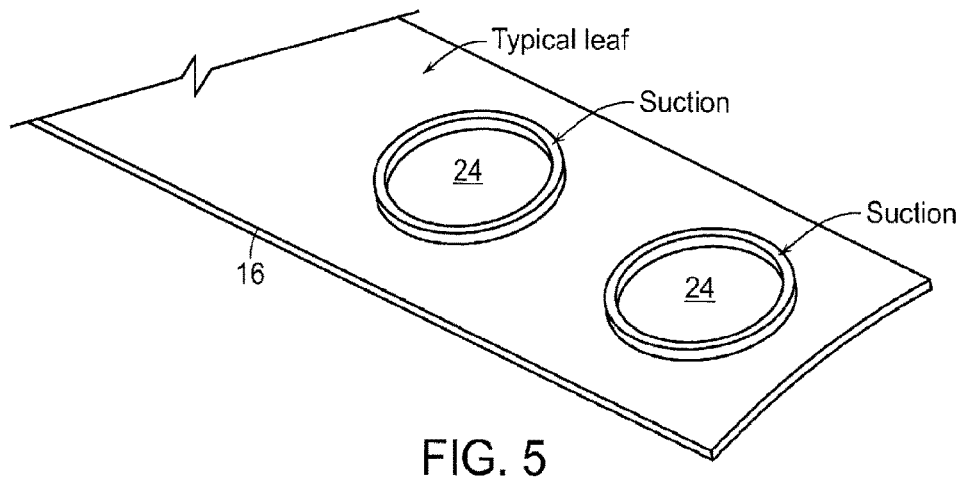
FIG. 5 is a perspective view of suction cups placed on a leaf membrane.

As shown in FIG. 5, it is preferred that the leaf structure 16 include suction cups 24 thereon.

Figure 6:
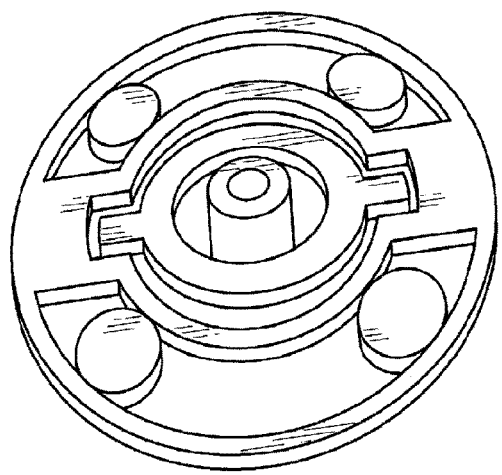
FIG. 6 is a perspective view of a gimbal mechanism to transmit axial forces from a leaf to force transducers to measure leak magnitude and location.
Figure 7:
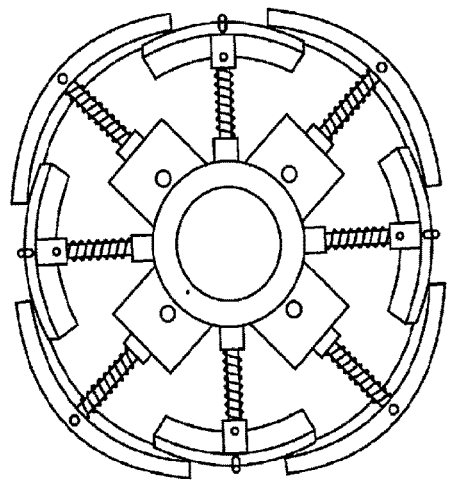
FIG. 7 is a cross-sectional view of another embodiment of the invention providing a compliant leak detector.

FIG. 6 shows a gimbal mechanism that can be used in conjunction with a force transmitting drum to sense an axial leak-generated force from any angle. Yet another embodiment of the invention is shown in FIG. 7 illustrating compliant leaves to conform to changing pipe diameters.

In operation, as the leak detecting device 10 moves axially along a pipe, the leaf structures 16 will be urged outwardly so that the spherical ball bearing 18 contacts an inner wall of the pipe thereby ensuring that the leaf structure is very close to a leak in a pipe wall.

As the device 10 passes over a leak, the flexible membrane 22 will be urged into contact with the leak because of flow through the leak. The contact of the membrane 22 with the pipe wall provides a drag force on the device 10, the measurement of which indicates the presence of a leak. It has been found that the suction cups 24 aid in producing drag allowing leak detection.

It is thus seen that the present invention provides a compliant leak detection system that can operate within pipes having a constant wall thickness or scaled pipe having a variable wall thickness. The present system moves axially within a pipe and the independent leaves retract radially inward as a pipe narrows. If the pipe becomes cleaner, the leaves open up by the action of torsional springs installed on the inner cylindrical joints. The present invention will reduce the number of force transducers to two as has been shown experimentally and theoretically.

It is recognized that modifications and variations of the invention will be apparent to those of ordinary skill in the art and it is intended that all such modifications and variations be included within the scope of the appended claims.

REFERENCES

[1] IDA, International Desalination Association, Inventory report, 2001.

[2] IRIN, News website, WWW.osisoft.com, October 2007.

[3] Hunaidi, O. and Chu, W. T., 1999, "Acoustical Characteristics of Leak Signals in Plastic Distribution Pipes", Applied Acoustics, 58:235-254.

[4] Kurtz, D. W., 2006. Pure Technologies US Inc., Central Regional Office, 7107, Lavendale Avenue, Dallas, Tex., 2006.

[5] Yang, J., Wen, Y. and Li, P., 2008, "Leak location using blind system identification in water distribution pipelines", Journal of sound and vibration, 310(1-2):134-148.

[6] R. Ben-Mansour, M. A. Habib, A. Khalifa, K. Youcef-Toumi and D. Chatzigeorgiou, "Computational Fluid Dynamic Simulation of Small Leaks in Water Pipelines for Direct Leak Pressure Transduction," *Computers and Fluids*, 57:110-123 2012

[7] Darby et. al, Providing reliable supply of safe drinking water poses challenges California Agriculture 54(5):69-77. DOI: 10.3733/ca.v054n05p69. September-October 2000.

What is claimed is:

1. Compliant leak detection system comprising:
   structure adapted to support at least two rows of leak detection leaves, each leak detection leaf supported by an arm pivotally attached to the structure and urged outwardly by a torsion spring into contact with a pipe wall so as to adjust for changes in pipe diameter;
   a spherical bearing at an end of each of the leak detection leaves for engaging an inner surface of the pipe wall;
   wherein the leak detection leaf includes a rigid support and a flexible membrane, whereby suction from a leak will cause the flexible membrane to contact the pipe wall and put a drag force on the structure; and
   an axial force transmitting drum to measure the drag force to indicate the leak.

2. The leak detection system of claim 1 wherein the flexible membrane includes suction cups thereon.

3. The leak detection system of claim 1 further including a gimbal mechanism to transmit axial forces to force transducers on the axial force transmitting drum.

4. The leak detection system of claim 1 wherein the leak detection leaves cover an inner wall of the pipe for its entire circumference.

5. The leak detection system of claim 1 wherein the structure is collapsible to pass through substantially smaller diameter sections of the pipe.

6. The leak detection system of claim 1 wherein the changes in pipe diameter arise from pipe damage, scale formation in pipes carrying brackish water or pipes carrying liquids containing solid particles.

7. The leak detection system of claim 5 wherein the smaller diameter sections result from tees, elbows or a section repaired with an insert having a smaller diameter.

* * * * *